United States Patent Office 3,567,682
Patented Mar. 2, 1971

3,567,682
ANTIOXIDANTS
Edward F. Zaweski, Pleasant Ridge, Mich., assignor to Ethyl Corporation, New York, N.Y.
No Drawing. Original application Oct. 11, 1967, Ser. No. 674,646. Divided and this application Nov. 24, 1969, Ser. No. 879,597
Int. Cl. C08f 45/58
U.S. Cl. 260—45.85                               9 Claims

ABSTRACT OF THE DISCLOSURE

Reaction of hydrogen sulfide with the hemi-quinone of a methylene bisphenol results in a tetranuclear phenol in which two molecules of the methylene bisphenol are bridged at their methylene groups through a sulfur atom. These are thiodimethylidyne tetrakisphenols. The compounds are useful as antioxidants, either alone or in combination with a dialkylthiodialkanoate, a phosphite or a phosphonate synergist.

---

This application is a division of application Ser. No. 674,646, filed Oct. 11, 1967.

BACKGROUND

Many organic materials undergo oxidative or thermal degradation on aging or exposure to high temperatures. The problem is particularly acute in the plastic, rubber and petroleum industries. Plastics not only must possess long life, but they must be able to withstand the temperatures employed in fabricating them into commercial forms. This problem has been brought to the fore by the Ziegler type poly-alpha-olefins derived from alpha-olefins containing 3 or more carbon atoms. These plastics not only require higher fabrication temperatures due to their higher melt point, but contain many tertiary carbon atoms which are readily attacked by oxygen.

Another area of great interest is the stabilization of lubricating oils, both mineral and synthetic, against degradation at the increased temperatures encountered in modern reciprocating engines and turbines.

SUMMARY

This invention relates to a process for making thiodimethylidyne tetrakisphenols and to the use of these compounds as antioxidants in a broad range of organic materials.

An object of this invention is to provide new antioxidants and a process for their manufacture. A further object is to provide a means of stabilizing organic material normally susceptible to oxidative degradation. These and other objects are accomplished by providing a compound having the formula:

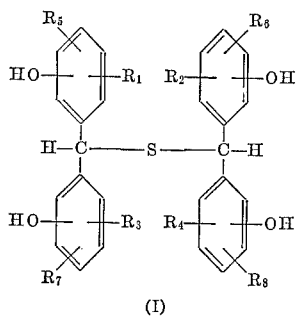

(I)

wherein $R_1$, $R_2$, $R_3$ and $R_4$ are selected from the group consisting of $C_{1-20}$ alkyl radicals, $C_{6-20}$ aryl radicals, $C_{1-20}$ aralkyl radicals, and $C_{6-20}$ cycloalkyl radicals, and $R_5$, $R_6$, $R_7$ and $R_8$ are selected from the group consisting of hydrogen and the same group as $R_{1-4}$.

Some examples of these compounds are:

2,2′,2″,2‴-(thiodimethylidyne)tetrakis(4,6-di-tert-butylphenol)
2,2′,2″,2‴-(thiodimethylidyne)tetrakis(4-methyl-6-tert-butylphenol)
4,4′,4″,4‴-(thiodimethylidyne)tetrakis(6-tert-butyl-m-cresol)
2,2,2″,2‴-(thiodimethylidyne)tetrakis(5-methylphenol)
4,4′,4″,4‴-(thiodimethylidyne)tetrakis[6(α-methylbenzyl)-o-cresol]
2,2′,2″,2‴-(thiodimethylidyne)tetrakis(3,6-di-tert-butylphenol)
4,4′,4″,4‴-(thiodimethylidyne)tetrakis(2-cyclohexylphenol)
4,4′,4″,4‴-(thiodimethylidyne)tetrakis(6-sec-dodecyl-o-cresol)
2,2′,2″,2‴-(thiodimethylidyne)tetrakis(4-sec-eicosylphenol)
4,4′,4″,4‴-(thiodimethylidyne)tetrakis[2-(α-naphthyl)-6-(3-phenanthryl)-phenol]

In a more preferred embodiment, the thiodimethylidyne tetrakisphenols have at least one substituent ortho to each phenolic hydroxyl radical and each phenolic group is bonded to the methylene bridge at its para position. These compounds have the formula:

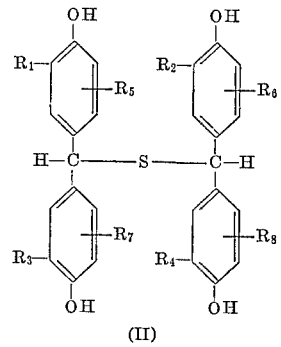

(II)

wherein $R_{1-8}$ are selected from the same groups defined in Formula I.

Typical examples of these compounds are:

4,4′,4″,4‴-(thiodimethylidyne)tetrakis(2-tert-butylphenol)
4,4′,4″,4‴-(thiodimethylidyne)tetrakis[6(α-methylbenzyl)-o-cresol]
4,4′,4″,4‴-(thiodimethylidyne)tetrakis(6-cyclohexyl-m-cresol)
4,4′,4″,4‴-(thiodimethylidyne)tetrakis(6-isopropyl-o-cresol)
4,4′,4″,4‴-(thiodimethylidyne)tetrakis(2,6-dimethylphenol)
4,4′,4″,4‴-(thiodimethylidyne)tetrakis(6-phenyl-m-cresol)
4,4′,4″,4‴-(thiodimethylidyne)tetrakis[2-(α,α-dimethylbenzyl)phenol]
4,4′,4″,4‴-(thiodimethylidyne)tetrakis(2-sec-eicosyl-5-ethylphenol)
4,4′,4″,4‴-(thiodimethylidyne)tetrakis(2-cyclooctyl-6-cycloheptylphenol)

In a highly preferred embodiment, the phenolic hydroxyl radicals are sterically hindered. These compounds have the formula:

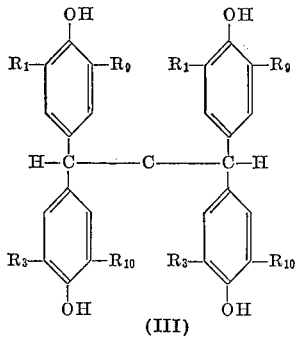

wherein $R_1$ and $R_3$ are selected from the same group previously defined and $R_9$ and $R_{10}$ are selected from the group consisting of $C_{9-20}$ alpha-branched alkyl radicals, $C_{6-20}$ cycloalkyl radicals, and $C_{8-20}$ alpha-branched aralkyl radicals. Examples of these compounds are:

4,4',4'',4'''-(thiodimethylidyne)tetrakis(6-tert-butyl-o-cresol)

4,4',4'',4'''-(thiodimethylidyne)tetrakis(2,6-di-sec-butylphenol)

4,4',4'',4'''-(thiodimethylidyne)tetrakis[2,6-di(α-methylbenzyl)phenol]

4,4',4'',4'''-(thiodimethylidyne)tetrakis(2,6-dicyclohexylphenol)

4,4',4'',4'''-(thiodimethylidyne)tetrakis(6-sec-eicosyl-o-cresol)

4,4',4'',4'''-(thiodimethylidyne)tetrakis(2,6-diisopropylphenol)

4,4',4'',4'''-(thiodimethylidyne)tetrakis[6-(α,α-dimethylbenzyl)-o-cresol]

4,4',4'',4'''-(thiodimethylidyne)tetrakis(2,6-di-tert-octylphenol)

4,4',4'',4'''-(thiodimethylidyne)tetrakis(2-phenyl-6-tert-butylphenol)

4,4',4'',4'''-(thiodimethylidyne)tetrakis[2-(3,5-di-tert-butylphenyl)-6-isopropylphenol]

The most prefered additive is 4,4',4'',4'''-(thiodimethylidyne)tetrakis(2,6-di-tert-butylphenol).

Additives of this invention are made by reacting a hemi-quinone selected from compounds having the formula:

(A)

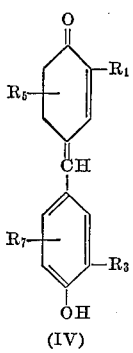

wherein $R_1$, $R_3$, $R_5$ and $R_7$ are selected from the same groups as defined in Formula I, and (B)

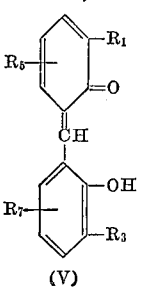

wherein $R_1$, $R_3$, $R_5$ and $R_7$ are selected from the same groups as defined in Formula I with hydrogen sulfide at a temperature of from about 0–250° C. Examples of hemi-quinones of Type (A) above are:

3-methyl-6-tert-butyl-4-(2-methyl-5-tert-butyl-4-hydroxybenzylidene)-2,5-cyclohexadien-1-one 6-(α-methylbenzyl)-4-[3-(α-methylbenzyl-4-hydroxybenzyl]-2,5-cyclohexadien-1-one 2-sec-eicosyl-4-(3-sec-eicosyl-4-hydroxybenzylidene)-2,5-cyclohexadien-1-one 2-cyclohexyl-4-(3cyclohexyl-4-hydroxybenzylidene)-2,5-cyclohexadien-1-one 2-phenyl-6-methyl-4-(3-phenyl-5methyl-4-hydroxybenzylidene)-2,5-cyclohexadien-1-one 2,5-di-sec-butyl-4-(3,6-di-sec-butyl-4-hydroxybenzylidene)-2,5-cyclohexadien-1-one Examples of hemi-quinones of Type (B) above are:

6-tert-butyl-2-(3-tert-butyl-2-hydroxybenzylidene)-3,5-cyclohexadien-1-one 4,6-di(α-methylbenzyl)-2-[3,5-di(α-methylbenzyl)-2-hydroxybenzylidene]-3,5-cyclohexadien-1-one 4-methyl-6-tert-butyl-2-(3-tert-butyl-5-methyl-2-hydroxybenzylidene)3,5-cyclohexadien-1-one 6-cyclohexyl-2-(3-cyclohexyl-2-hydroxybenzylidene)-3,5-cyclohexadien-1-one 4-methyl-6-tert-eicosyl-2-(3-tert-eicosyl-5-methyl-2-hydroxybenzylidene)-3,5-cyclohexadien-1-one In making the highly preferred compounds of this invention, the hemi-quinone reactants employed have the formula:

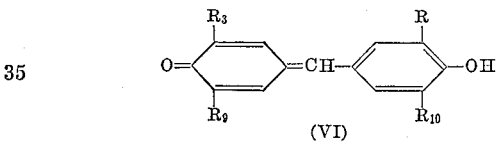

wherein $R_1$ and $R_3$ are selected from the same group as in Formula I, and $R_9$ and $R_{10}$ are selected from the group consisting of $C_{3-20}$ alpha-branched alkyl radicals, $C_{6-20}$ cycloalkyl radicals and $C_{8-20}$ alpha-branched aralkyl radicals.

Examples of these sterically hindered hemi-quinones are:

2-methyl-6-tert-butyl-4-(3-methyl-5-tert-butyl-4-hydroxybenzylidene)-2,5-cyclohexadien-1-one 2,6-di-isopropyl-4-(3,5-di-isopropyl-4-hydroxybenzylidene)-2,5-cyclohexadien-1-one 2,6-(α-methylbenzyl)-4-[3,5-di(α-methylbenzyl)-4-hydroxybenzylidene]-2,5-cyclohexadien-1-one 2-methyl-6-cyclohexyl-4-(3-methyl-5-cyclohexyl-4-hydroxybenzylidene)-2,5-cyclohexadien-1-one 2,6-di-sec-eicosyl-4-(3,5-di-sec-eicosyl-4-hydroxybenzylidene)-2,5-cyclohexadien-1-one 2,6-dicyclohexyl-4-(3,5-dicyclohexyl-4-hydroxybenzylidene)-2,5-cyclohexadien-1-one In making the most preferred 4,4',4'',4'''-(thiodimethylidyne)tetrakis(2,6-di-tert-butylphenol), the hemi-quinone reactant employed is 2,6-di-tert-butyl-4-(3,5-di-tert-butyl-4-hydroxybenzyl)-2,5-cyclohexadien-1-one.

The hemi-quinones used as starting materials are known compounds [Kharasch and Joshi, J. Org. Chem., 22, 1435 (1957), and U.S. Pat. No. 2,940,988, June 14, 1960]. Another method of making these compounds is by the reaction of the proper bromomethylene bisphenol with potassium cyanide in aqueous acetone. For example, the reaction of 4,4'-bromoethylene bis(2,6-di-tert-butylphenol) with potassium cyanide at about 0° C. results in an almost quantitative yield of 2,6-di-tert-butyl-4-(3,5-di-tert-butyl - 4 - hydroxybenzylidene)-2,5-cyclohexadien-1-one melting at 158° C.

The conversion of the hemi-quinone to the thiodimethylidyne tetrakisphenol is accomplished by dissolving the hemi-quinone in a suitable solvent and adding hydrogen sulfide. Useful solvents are those in which the hemi-quinones have some solubility and which are substantially inert under the reaction conditions. These include hydrocarbons, ethers, ketones, esters, and the like.

Useful hydrocarbons include both aliphatics and aromatics. Preferred aliphatics are those boiling in the range from about 50–200° C. Examples of these include n-hexane, isohexanes, heptanes, octanes, nonanes, decanes, and mixtures such as petroleum ethers. Useful aromatics are benzene, toluene, xylene, and the like. Also, halogenated hydrocarbon solvents can be used such as chloroform, carbontetrachloride, 1,1,1-trichloroethane, chlorobenzene, dichlorobenzene, and the like.

Ether solvents include diethyl ether, di-n-propyl ether, ethyleneglycol diethyl ether, diethyleneglycol dimethyl ether, and the like.

Suitable ketones include acetone, methylethyl ketone, and the like. Useful esters are amyl acetate, hexyl propionate, propyl butyrate, and the like.

The most preferred solvents are the aromatic hydrocarbons such as benzene, toluene, xylene, and mixtures of aromatic hydrocarbons boiling from 80–200° C.

The stoichiometry of the reaction requires at least one mole of hydrogen sulfide per 2 moles of hemi-quinone. In practice, the reaction is conducted by bubbling hydrogen sulfide through a solution of the hemi-quinone, so an excess of hydrogen sulfide is usually used. About 0.5 to 100 moles of hydrogen sulfide can be used per mole of hemi-quinone.

In order to accelerate the reaction rate the reaction can be run under hydrogen sulfide pressure, although this is not required since it proceeds well at atmospheric pressure. In practice, pressures of from about 0 to 1000 p.s.i.g. are useful, and pressures from 0–500 p.s.i.g. are preferred.

Temperature is not an independent variable since it depends to some extent on the reactivity of the particular hemi-quinone and on the reaction time. Higher temperatures require less reaction time. In general, the reaction temperatures should be such that a reasonable reaction rate is obtained and excessive side reactions are not encountered. Temperatures from 0–200° C. are useful and, in most cases, a temperature of from 25–100° C. is preferred.

Although no catalyst is required to cause the reaction to proceed, it has been found that better yields are obtained if the reaction mixture is slightly acid. Although not bound by theory, this is believed to be because the product is more stable under neutral or slightly acidic conditions. These conditions can be assured by merely adding a small amount of acid to the reaction mixture. Useful acids include hydrochloric, phosphoric, sulfuric, formic, acetic, oxalic, and the like. From about 1–10 parts of acid per 1000 parts of reaction mixture is generally satisfactory.

The following examples serve to illustrate the methods of making the thiodimethylidyne tetrakisphenols. All parts are by weight unless otherwise specified.

EXAMPLE 1

In a reaction vessel fitted with stirrer and means for introducing hydrogen sulfide was placed 16 parts of 2,6-di-tert-butyl-4-(3,5 - di - tert-butyl-4-hydroxybenzylidene)-2,5-cyclohexadiene-1-one and 50 parts of toluene. There was then added 0.5 part of concentrated hydrochloric acid and, while stirring, hydrogen sulfide was bubbled through the solution at room temperature for 3 hours. The solvent was then evaporated off under vacuum, leaving a brown orange solid. This was recrystallized from isopropanol, yielding 13 parts of 4,4',4'',4'''-(thiodimethylidyne)tetrakis(2,6 - di - tert-butylphenol) (M.P. 240–243), identified by elemental analysis and molecular weight determination.

EXAMPLE 2

In a pressure reaction vessel place 338 parts of 4-methyl-6-tert-butyl - 2 - (3-tert-butyl-5-methyl-2-hydroxybenzylidene)-3,5-cyclohexadiene-1-one and 1,000 parts of xylene. Flush the vessel with nitrogen and then pressurize the vessel to 500 p.s.i.g. with hydrogen sulfide. While stirring, heat the vessel to 200° C. over a one hour period and then cool to room temperature. Vent the residual hydrogen sulfide and discharge the vessel contents. Evaporate the solvent and recrystallize the residue from isopropanol, yielding 2,2',2'',2'''-(thiodimethylidyne)tetrakis-(4-methyl-6-tert-butylphenol).

The above reaction can be carried out using equal mole amounts of any of the previously-listed hemi-quinones to yield the corresponding thiodimethylidyne tetrakisphenol. Also, other solvents may be employed such as chlorobenzene, dichlorobenzene, isooctane, diethyleneglycol dimethyl ether, carbontetrachloride, and the like. The reaction can be conducted in a manner similar to Example 2 except heating only to 125° C. over a 2 hour period with good results. Furthermore, yields can be improved if Example 2 is repeated in the presence of 10 parts of phosphoric acid.

EXAMPLE 3

The procedure of Example 1 is repeated with a variety of hemi-quinones at various temperatures using xylene as a solvent and sulfuric acid in place of hydrochloric acid. The results are shown in the following table.

| Hemi-quinone | Temp., ° C. | Product |
| --- | --- | --- |
| 2,6-dicyclohexyl-4-(3,5-dicyclohexyl-4-hydroxybenzylidene)-2,5-cyclohexadiene-1-one. | 0 | 4,4',4'',4'''-(thiodimethylidyne)tetrakis (2,6-dicyclohexylphenol). |
| 2,6-(α-methylbenzyl)-4-[3,5-di(α-methylbenzyl)-4-hydroxybenzylidene]-2,5-cyclohexadiene-1-one. | 25 | 4,4',4'',4'''-(thiodimethylidyne)tetrakis [2,6-di(α-methylbenzyl)phenol]. |
| 2,6-di-sec-butyl-4-(3,5-di-sec-butyl-4-hydroxybenzylidene)-2,5-cyclohexadiene-1-one. | 50 | 4,4',4'',4'''-(thiodimethylidyne)tetrakis (2,6-di-sec-butylphenol). |
| 3-methyl-6-tert-butyl-4-(2-methyl-5-tert-butyl-4-hydroxybenzylidene)-2,5-cyclohexadiene-1-one. | 75 | 4,4',4'',4'''-(thiodimethylidyne)tetrakis (6-tert-butyl-m-cresol). |
| 4-methyl-6-tert-butyl-2-(3-methyl-5-tert-butyl-6-hydroxybenzylidene)-3,5-cyclohexadiene-1-one. | 100 | 2,2',2'',2'''-(thiodimethylidyne)tetrakis (4-methyl-6-tert-butylphenol). |
| 2-phenyl-6-sec-eicosyl-4-(3-phenyl-5-sec-eicosyl-4 hydroxybenzylidene)-2,5-cyclohexadiene-1-one. | 110 | 4,4',4'',4'''-(thiodimethylidyne)tetrakis (2-phenyl-6-sec-eicosylphenol). |

EXAMPLE 4

In a pressure reaction vessel place one mole part of 2-methyl-6-tert-butyl-4-(3-methyl - 5 - tert-butyl - 4 - hydroxybenzylidene)-2,5-cyclohexadiene - 1 - one and 750 parts of toluene. Flush the vessel with nitrogen and then pressurize the vessel to 1000 p.s.i.g. with hydrogen sulfide. While stirring, heat the vessel to 75° C. and stir at this temperature for 2 hours. Cool the vessel to room temperature and vent residual pressure. Discharge the vessel contents, evaporate the solvent under vacuum and recrystallize the product from isooctane, yielding 4,4′,4″,4‴-(thiodimethylidyne)-tetrakis(6-tert-butyl-o-cresol).

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, butadiene-styrene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes, India rubber, reclaimed rubber, balata rubber, gutta percha rubber, and the like. Both natural rubber and synthetic rubbers such as neoprene, SBR rubber, EPT rubber, GR-N rubber, chloroprene rubber, polyisoprene rubber, EPR rubber, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight homopolymers and copolymers of olefinically unsaturated monomers such as polyethylene and polypropylene (both high pressure and so-called Ziegler type), polybutene, polybutadiene (both cis and trans), ethylene-propylene rubber, acrylonitrile-butadiene-styrene terpolymer, ethylene-propylene-diene terpolymers such as ethylene-propylene-1,5-cyclooctadiene and ethylene-propylene-dicyclopentadiene, and the like.

The amount of stabilizer used in the organic compositions of this invention is not critical as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 5

A rubber stock is prepared containing the following components:

| Component: | Parts |
| --- | --- |
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |

To the above base formula is added one part by weight of 4,4′,4″,4‴-(thiodimethylidyne)tetrakis(2,6 - di - tert-butylphenol) and, following this, individual samples are cured for 20, 30, 45 and 60 minutes, respectively, at 274° C. After cure, all of these samples remain white in color and possess excellent tensile strength. Furthermore, they are resistant to degradation caused by oxygen or ozone on aging.

EXAMPLE 6

A synthetic rubber master batch comprising 100 parts of GR-S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of 2,2′,2″,2‴-(thiodimethylidyne)tetrakis(4,6-di-tert-butylphenol). This composition is then cured for 60 minutes employing 45 p.s.i.g. of steam pressure. The resulting synthetic rubber possesses resistance to oxygen and ozone induced degradation.

EXAMPLE 7

A butadiene-acrylonitrile copolymer is prepared from 68 percent 1,3-butadiene and 32 percent acrylonitrile. Two percent, based on the weight of the copolymer, of 4,4′,4″,4‴(thiodimethylidyne)tetrakis(6-tert-butyl-m-cresol) is added as an aqueous emulsion to the latex obtained from emulsion copolymerization of the butadiene and acrylonitrile monomers. The latex is coagulated with aluminum sulfate and the coagulum, after washing is dried for 20 hours at 70° C. The synthetic copolymer so obtained is resistant to oxidative degradation.

EXAMPLE 8

Three percent of 4,4′,4″,4‴-(thiodimethylidyne)tetrakis(6-sec-dodecyl-o-cresol) as an emulsion in sodium oleate is added to a rubber-like copolymer of 1,3-butadiene and styrene containing 25 percent styrene. The resulting synthetic elastomer possesses enhanced stability.

EXAMPLE 9

To a master batch of GR-N synthetic rubber containing 100 parts of GR-N rubber, 5 parts of zinc stearate, 50 parts of carbon black, 5 parts of road tar, 2 parts of sulfur and 2 parts of mercaptobenzothiazole is added 5 percent, based on weight, of 2,2′,2″,2‴-(thiodimethylidyne) tetrakis(4-sec-eicosylphenol). After curing, a synthetic rubber is obtained of improved oxidative stability.

EXAMPLE 10

To a master batch of polyethylene having an average molecular weight of 1,000,000, a tensile strength of 6,700 p.s.i., a Shore D hardness of 74, and a softening temperature under low load of 150° C., is added 5 percent of 4,4′,4″,4‴ - (thiodimethylidyne)tetrakis(2 - tert - butylphenol). The resulting polyethylene possesses stability against oxidative degradation and shows no tendency to yellow after extensive aging.

EXAMPLE 11

A linear polyethylene having a high degree of crystallinity (93 percent) and less than one branched chain per 100 carbon atoms, a density of about 0.96 gram per ml. and which has about 1.5 double bonds per 100 carbon atoms, is mixed with 0.005 weight percent of 4,4',4",4'''-(thiodimethylidyne)tetrakis(6 - cyclohexyl-m-cresol). The resulting polyethylene is found to possess stability against oxidative degradation.

EXAMPLE 12

To 100 parts of an ethylene-propylene terpolymer with 1,5-cyclooctadiene is added 3 parts of 4,4',4",4'''-(thiodimethylidyne)tetrakis(6-isopropyl-o-cresol), resulting in an ethylene-propylene terpolymer of enhanced stability.

EXAMPLE 13

To 100 parts of an ethylene-propylene rubber is added 2 parts of 4,4',4",4''' - (thiodimethylidyne)tetrakis(6-phenyl-m-cresol), resulting in an EPR rubber stock of improved stability.

EXAMPLE 14

After the polymerization of polypropylene in a hexane solvent employing a Ziegler catalyst, the catalyst is neutralized with water and 4,4',4",4'''-(thiodimethylidyne)tetrakis(2,6-di-tert-butylphenol) is added to the mixture in quantities such that, after evaporation of the solvent, a Ziegler polypropylene is obtained containing 2 percent of 4,4',4",4''' - (thiodimethylidyne)tetrakis(2,6-di-tert-butylphenol). This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 15

To 1,000 parts of a crystalline polypropylene prepared using a Ziegler type catalyst is added 1 weight percent of 4,4',4",4'''-(thiodimethylidyne)tetrakis(6 - tert - butyl - o-cresol). The resulting mixture is melted and stirred, resulting in a molten polypropylene composition possessing excellent resistance to thermal degradation.

EXAMPLE 16

To 1,000 parts of poly-cis-butadiene dissolved in benzene is added 0.15 weight percent of 4,4',4",4'''-(thiodimethylidyne)tetrakis(2,6-di-sec-butylphenol). The resultant poly-cis-butadiene solution is transferred slowly into boiling water, which causes the water and benzene to co-distill, leaving a stabilized poly-cis-butadiene.

EXAMPLE 17

To 1,000 parts of a crystalline polypropylene made using a Ziegler catalyst is added 1 weight percent of 4,4',4",4''' - (thiodimethylidyne)tetrakis[2,6-di($\alpha$-methylbenzyl)phenol]. The mixture is melted and immediately stirred, giving a highly stable polypropylene.

EXAMPLE 18

To 1,000 parts of solvent-refined mid-continent neutral lubricating oil containing 0.05 percent zinc-dilaurylthiophosphate, 4 percent of a poly-laurylmethacrylate VI Improver and 0.05 percent of an over-based calcium sulfonate and 2 percent of a dispersant formed by reacting an alkenyl succinic anhydride wherein the alkenyl chain is a polybutene with a molecular weight of about 1,000 with tetraethylene pentamine is added 0.05 percent of 4,4',4",4'''-(thiodimethylidyne)tetrakis(2,6-di-cyclohexylphenol). The resulting oil is resistant to thermal and oxidant deterioration.

EXAMPLE 19

To 1,000 parts of an acrylonitrile-styrene butadiene resin (ABS resin) is added 10 parts of carbon black and 5 parts of 4,4',4",4'''-(thiodimethylidyne)tetrakis(2,6-diisopropylphenol). The mixture is blended in a Banbury mixer, resulting in a highly stable ABS resin.

EXAMPLE 20

To 1,000 parts of a gasoline containing 26.6 percent aromatics, 20.8 percent olefins, 52.6 percent saturates and having an API gravity of 62.1 is added 10 parts of 4,4',4",4''' - (thiodimethylidyne)tetrakis[6-($\alpha,\alpha$-dimethylbenzyl)-o-cresol]. The resulting gasoline is stable.

EXAMPLE 21

To 10,000 parts of gasoline containing 8.6 percent aromatics, 7.9 percent olefins, 83.5 percent saturates and having an API gravity of 68.5 is added 200 parts of 4,4',4",4''' - (thiodimethylidyne)tetrakis(2,6-di-tert-octylphenol). The resulting gasoline is stable against oxidative degradation.

EXAMPLE 22

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of 4,4',4",4'''-(thiodimethylidyne)tetrakis (2-phenyl-6-tert-butylphenol). The resulting gasoline containing a manganese antiknock was resistant to oxidative degradation.

EXAMPLE 23

To 10,000 parts of a gasoline containing 20.5 percent aromatics, 32.9 percent olefins and 46.6 percent saturates and containing 2.39 grams per gallon of tetraethyllead and one theory of chlorine as ethylenedichloride and 0.5 theory of bromine as ethylenedibromide is added 500 parts of 4,4',4",4''' - (thiodimethylidyne)tetrakis[2-(3,5-di-tert-buytlphenyl)-6-isopropylphenol]. The resulting gasoline containing a lead antiknock and halogen scavenger is resistant to oxidative degradation.

EXAMPLE 24

To 10,000 parts of gasoline containing 38.1 percent aromatics, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tris($\beta$-chloroisopropyl)thionophosphate is added 50 parts of 4,4',4",4'''-(thiodimethylidyne)tetrakis(2,6-di-tert-butylphenol). The resulting gasoline is resistant to degradation.

EXAMPLE 25

An antiknock fluid composition is prepared by mixing together 61.5 parts of tetraethyllead, 17.9 parts of ethylenedibromide, 18.8 parts of ethylenedichloride and 1.3 parts of 4,4',4",4'''-(thiodimethylidyne)tetrakis(6-tert-butyl-o-cresol), resulting in a stable antiknock fluid composition.

EXAMPLE 26

To 1,000 parts of a commercial diesel fuel having a cetane number of 42 is added 5 parts of amyl nitrate and 4 parts of 4,4',4",4'''-(thiodimethylidyne)tetrakis[2,6-di($\alpha$-methylbenzyl)phenol], resulting in a diesel fuel of high resistance to oxidative deterioration which does not form gum or sludge on storage.

EXAMPLE 27

To 1,000 parts of a solvent-refined neutral oil (95 viscosity index and 200 SUS at 100° F.) containing 6 percent of a commercial methacrylate VI Improver is added 5 percent of 4,4',4",4'''-(thiodimethylidyne)tetrakis(2,6-di-tert-butylphenol), resulting in a stable lubricating oil.

EXAMPLE 28

To a solvent-refined crankcase lubricating oil having a viscosity index of 95 and a SAE viscosity of 10 is added 0.1 percent of 4,4',4'',4'''-(thiodimethylidyne)tetrakis(6-tert-butyl-o-cresol). The resulting oil was stable against oxidative degradation.

EXAMPLE 29

To 100,000 parts of a petroleum hydrocarbon oil having a gravity of 30.3° API at 60° F., viscosity of 178.8 SUS at 100° F., a viscosity index of 154.2, and containing 1,000 parts of the reaction product of an alkenyl succinic anhydride where the alkenyl group has a molecular weight of 2,000, with a polyethylene amine, is added 200 parts of 4,4',4'',4''' - (thiodimethylidyne)tetrakis-(2,6-di-cyclohexylphenol). The resulting lubricating oil possesses excellent dispersancy and is resistant to oxidative degradation.

EXAMPLE 30

To 100,000 parts of a commercially available pentaerythritol ester having a viscosity at 100° F. of 22.4 centistokes and known under the tradename of "Hercoflex 600" is added 400 parts of 4,4',4'',4'''-(thiodimethylidyne)tetrakis(2,6-diisopropylphenol). The resulting synthetic lubricating oil possesses improved resistance against oxidative deterioration.

EXAMPLE 31

To 100,000 parts of dioctyl sebacate having a viscosity at 210° F. of 36.7 SUS, a viscosity index of 159, and a molecular weight of 427 is added 250 parts of 4,4',4'',4'''-(thiodimethylidyne)tetrakis(2,6-di-tert - butylphenol), resulting in a synthetic diester lubricating oil having improved resistance to oxidative degradation.

EXAMPLE 32

To 1,000 parts of a commercial coconut oil is added 5 parts of 4,4',4'',4''' - (thiodimethylidyne)tetrakis(6 - tert-butyl-o-cresol), resulting in a vegetable oil with good aging characteristics.

EXAMPLE 33

To 100,000 parts of lard is added 100 parts of 4,4',4'',4''' - (thiodimethylidyne)tetrakis[6-(α,α-dimethylbenzyl-o-cresol], resulting in a lard having resistance to rancidity.

The stabilizing additives of this invention are eminently useful as stabilizers in homopolymers and copolymers of ethylenically unsaturated monomers such as polyethylene, polypropylene, and the like. In this use they function as antioxidants and also as thermal stabilizers. They are extremely long lasting and highly resistant to the formation of color.

In order to demonstrate their superior stabilization effect tests were conducted using a commercial polypropylene. These tests are known as "Oven Aging Tests" and are recognized in the plastic industry as an accurate guide to oxidative stability. In these tests small specimens of polypropylene are prepared containing the test stabilizer. These test specimens are placed in an air circulating oven maintained at 150° C. Five replicates are made of each polypropylene-stabilizer composition and the test criteria is the time in hours until three of the five replicates show signs of deterioration. Deterioration is evidenced by cracking, discoloration or any visual appearance of change in the specimen.

Test specimens are prepared by mixing the test stabilizers with polypropylene powder for 3 minutes in a Waring blender. The mixture is then molded into a 6" x 6" sheet with a thickness of 0.025" (25 mils). This is accomplished in a molding press at 400° F. under 5,000 p.s.i. pressure. Each sheet is then cut into ½" x 1" test specimens in order to obtain the five replicate samples. These samples are then subjected to the Oven Aging Tests.

The results obtained are shown in the following table.

| Additive | Concentration (wt. percent) | Sample thickness, mil | Hours to failure |
|---|---|---|---|
| None | | 25 | 2.5 |
| 4,4',4'',4'''-(thiodimethylidyne) tetrakis-(2,6-di-tert-butylphenol) | { 0.1<br>{ 0.3 | 25<br>25 | 40<br>88 |

The effectiveness of the present stabilizers can be enhanced still further by employing synergistic mixtures of the stabilizers of this invention. The preferred synergists are selected from the group consisting of compounds having the formula:

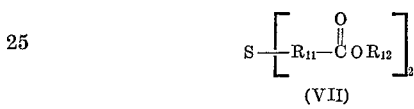

(VII)

wherein $R_{11}$ is a divalent hydrocarbon radical containing from 1 to about 6 carbon atoms and $R_{12}$ is an alkyl radical containing from 6 to about 20 carbon atoms, and compounds having the formula:

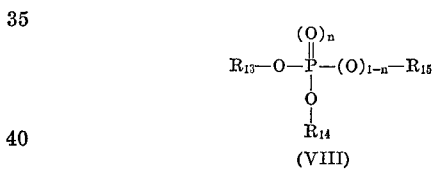

(VIII)

wherein $n$ is an integer from 0–1 and $R_{13}$ and $R_{14}$ are independently selected from the group consisting of alkyl radicals containing from 1 to about 20 carbon atoms, aralkyl radicals containing from 7 to about 20 carbon atoms, aryl radicals containing from 6 to about 20 carbon atoms and alkaryl radicals containing from 7 to about 20 carbon atoms, and $R_{15}$ is selected from hydrogen and $R_{13}$. Some examples of synergists are dilaurylthiodipropionate, diamylthiodiacetate, β,β'-thiobis(cetylbutyrate), dieicosylthiodiheptoate, diphenylthiodipropionate, dibenzylthiodibutyrate, didecylthiodipropionate, dihexylthiodiacetate, dibutyl-hydrogen phosphonate, trinonylphosphite, triphenylphosphite, trimethylphosphite, tri-n-butylphosphite, tributylphosphonate, tri-p-nonylphenylphosphite, di-p-nonylphenyl hydrogen phosphonate, tricresylphosphite, trinonylphosphonate, tricetylphosphite, tricyclohexylphosphite, and the like. Preferred synergists are represented by Formula VII wherein $R_{11}$ contains from 1–3 carbon atoms and $R_{12}$ is an alkyl radical containing from 10 to about 18 carbon atoms. The most preferred synergists are dilaurylthiodipropionate and distearylthiodipropionate.

The ratio of synergist to stabilizing compound should be adjusted to give the desired protection at the least cost. Mixtures containing from 1 percent synergist and 99 percent stabilizer to those containing 99 percent synergist and 1 percent stabilizer can be employed. A more useful range is from 10–90 percent. Best results are usually obtained with stabilizing mixtures containing from 50 to 66 percent synergist and from 34 to 50 percent stabilizing compound.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed.

The following table lists some useful synergistic combinations.

|  | Percent |
|---|---|
| (1) Dilaurylthiodipropionate | 66 |
| 4,4',4'',4'''-(thiodimethylidyne)tetrakis (2,6-di-tert-butylphenol) | 34 |
| (2) Dicetylthiodipropionate | 90 |
| 4,4',4'',4'''-(thiodimethylidyne)tetrakis(6-tert-butyl-o-cresol) | 10 |
| (3) Diamylthiodiacetate | 10 |
| 4,4',4'',4''' - (thiodimethylidyne)tetrakis(2,6-di-sec-butylphenol) | 90 |
| (4) Dioctadecylthiodipropionate | 50 |
| 4,4',4'',4'''-(thiodimethylidyne)tetrakis(2,6-di-cyclohexylphenol) | 50 |
| (5) Trinonylphosphite | 50 |
| 4,4',4'',4'''-(thiodimethylidyne)tetrakis(2,6-di-isopropylphenol) | 50 |
| (6) Tri-p-nonylphenylphosphite | 10 |
| 4,4',4'',4'''-(thiodimethylidyne)tetrakis[6 - (α,α-dimethylbenzyl)-o-cresol] | 90 |
| (7) Tributylphosphonate | 90 |
| 4,4',4'',4'''-(thiodimethylidyne)tetrakis(2,6-di-tert-octylphenol) | 10 |

The above synergistic combinations are useful in any of the previously-described organic materials. The organic compositions are prepared as shown in the previous examples by merely adding the synergistic combination in place of the antioxidant compound.

I claim:

1. Organic material normally susceptible to oxidative deterioration selected from the group consisting of natural and synthetic rubbers and homopolymers and copolymers of olefinically unsaturated monomers containing an antioxidant amount of a compound having the formula:

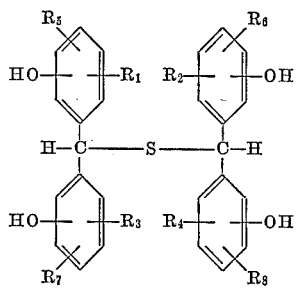

wherein $R_1$, $R_2$, $R_3$ and $R_4$ are selected from the group consisting of $C_{1-20}$ alkyl radicals, $C_{6-20}$ aryl radicals, $C_{1-20}$ aralkyl radicals, and $C_{6-20}$ cycloalkyl radicals, and $R_5$, $R_6$, $R_7$ and $R_8$ are selected from the group consisting of hydrogen and the same group as $R_{1-4}$.

2. A composition of claim 1 wherein said compound is a compound having the formula:

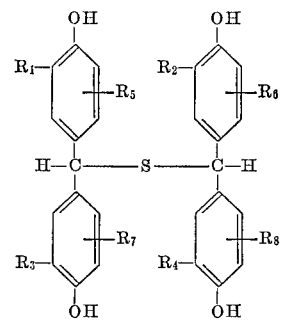

wherein $R_{1-8}$ are selected from the same groups defined in claim 1.

3. A composition of claim 2 wherein said compound is 4,4',4'',4'''-(thiodimethylidyne)tetrakis(2,6-di-tert-butylphenol).

4. A composition of claim 3 wherein said organic material is selected from the group consisting of homopolymers and copolymers of olefinically unsaturated monomers.

5. A composition of claim 4 wherein said organic material is polypropylene.

6. An organic composition of claim 1 containing, in addition to an antioxidant amount of said compound defined in claim 1, a synergistic amount of a synergist selected from the group consisting of compounds having the formula:

$$S(R_{11}-COOR_{12})_2$$

wherein $R_{11}$ is a divalent hydrocarbon radical containing from 1 to about 6 carbon atoms, and $R_{12}$ is a $C_{6-20}$ alkyl radical, and

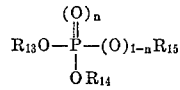

wherein $n$ is an integer from 0–1 and $R_{13}$ and $R_{14}$ are independently selected from the group consisting of alkyl radicals containing from 1 to about 20 carbon atoms, aralkyl radicals containing from 7 to about 20 carbon atoms, aryl radicals containing from 6 to about 20 carbon atoms and alkaryl radicals containing from 7 to about 20 carbon atoms, and $R_{15}$ is selected from hydrogen and $R_{13}$.

7. A composition of claim 6 wherein said organic material is selected from the group consisting of homopolymers and copolymers of ethylenically unsaturated monomers.

8. A composition of claim 7 wherein said organic material is polypropylene.

9. A composition of claim 8 wherein said compound defined in claim 1 is 4,4',4'',4'''-(thiodimethylidyne)tetrakis(2,6-di-tert-butylphenol) and wherein said synergist is dilaurylthiodipropionate.

References Cited

UNITED STATES PATENTS

| 3,274,258 | 9/1966 | Odenweller | 260—45.95 |
| 2,831,030 | 4/1958 | Chemicer | 260—609 |

HOSEA E. TAYLOR, Primary Examiner

U.S. Cl. X.R.

44—76; 99—163; 252—48.2, 48.6, 404, 406; 260—45.7, 45.95, 398.5, 609, 666.5

PO-1050
(5/69)

UNITED STATES PATENT OFFICE
CERTIFICATE OF CORRECTION

Patent No. 3,567,682          Dated    March 2, 1971

Inventor(s)          Edward F. Zaweski

It is certified that error appears in the above-identified patent and that said Letters Patent are hereby corrected as shown below:

Column 3, in Formula (III), that portion of the formula read
H—C ——— C ——— C—H   should read   H—C ——— S ——— C—F
line 20, "$C_{9-20}$" should read -- $C_{3-20}$ --; in Formula (IV), t
portion of the formula reading

   should read   

Column 4, in Formula (VI), that portion of the formula readi $R_3$ 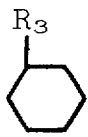   should read   $R_1$ 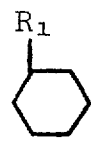

that portion of the formula reading

R 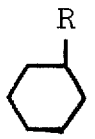   should read   $R_3$ 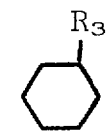

line 68, "4,4'-bromoethylene" should read -- 4,4'-bromomethy

Signed and sealed this 20th day of July 1971.

(SEAL)
Attest:

EDWARD M. FLETCHER, JR.          WILLIAM E. SCHUYLER, JI
Attesting Officer                Commissioner of Patent: